Figure 1A:
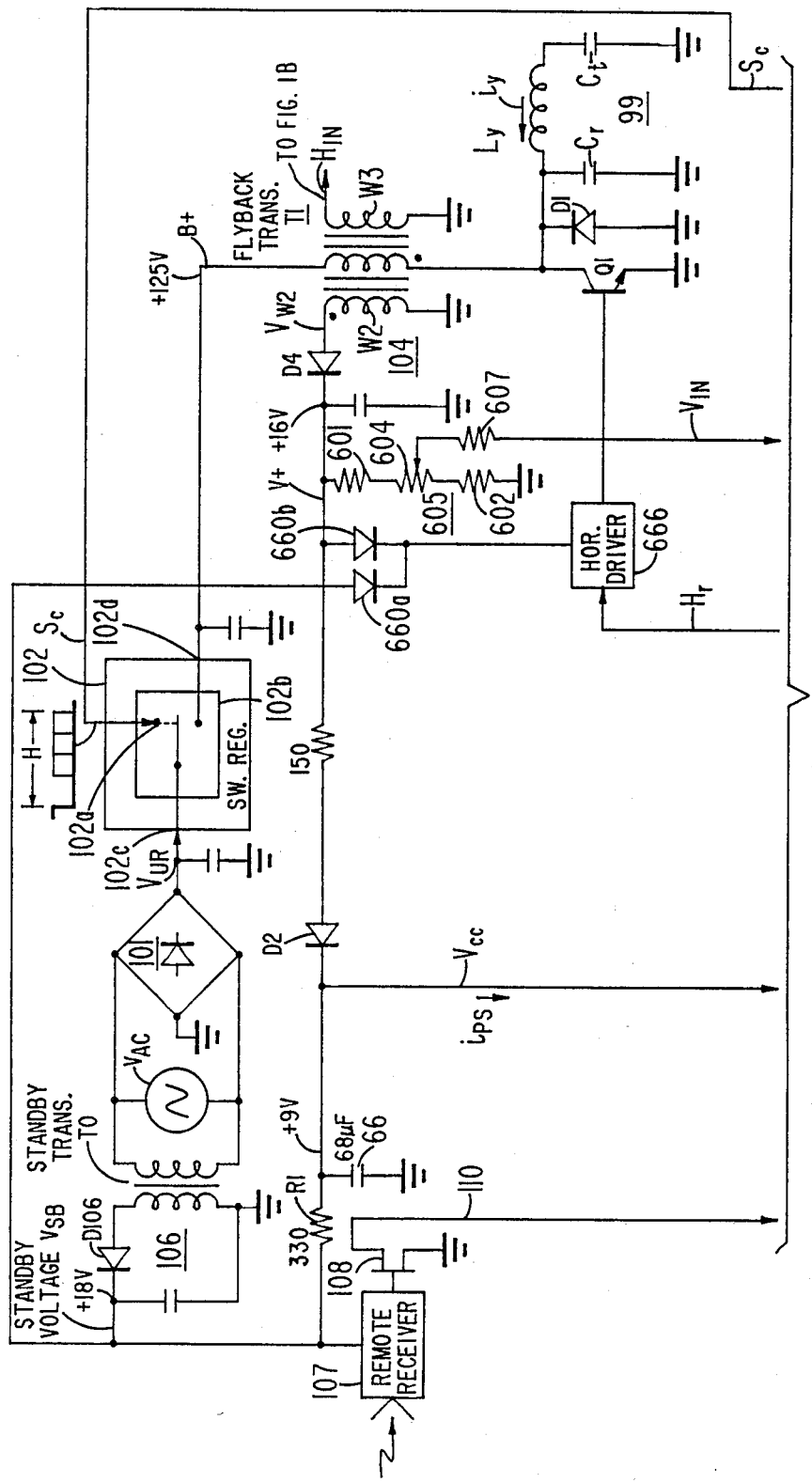

United States Patent [19]

Shanley, II et al.

[11] Patent Number: 4,737,851

[45] Date of Patent: Apr. 12, 1988

[54] ON/OFF CONTROL CIRCUITRY FOR TELEVISION

[75] Inventors: Robert L. Shanley, II, Indianapolis, Ind.; Jack Craft, Bridgewater; Michael L. Low, Old Bridge, both of N.J.; Jeffery B. Lendaro, Noblesville, Ind.

[73] Assignee: RCA Corporation, Princeton, N.J.

[21] Appl. No.: 42,077

[22] Filed: Apr. 24, 1987

[51] Int. Cl.$^4$ .............................................. H04N 5/63
[52] U.S. Cl. .................................. 358/190; 358/243; 315/411; 363/56
[58] Field of Search .................... 358/190, 243, 74; 315/411, 380; 363/21, 56, 20

[56] References Cited

U.S. PATENT DOCUMENTS

| | | | |
|---|---|---|---|
| 4,188,641 | 2/1980 | Baker et al. | 358/190 |
| 4,240,013 | 12/1980 | Wedam | 358/190 X |
| 4,301,394 | 11/1981 | Dietz | 315/411 X |
| 4,377,775 | 3/1983 | Willis | 315/411 |
| 4,385,264 | 5/1983 | Balaban et al. | 315/411 |
| 4,429,259 | 1/1984 | Luz | 358/190 X |
| 4,481,564 | 11/1984 | Balaban | 363/21 |
| 4,500,923 | 2/1985 | Duvall et al. | 358/190 |
| 4,516,168 | 5/1985 | Hicks | 358/190 |
| 4,532,457 | 7/1985 | Harferl | 358/190 X |
| 4,595,977 | 6/1986 | von der Ohe | 363/21 X |
| 4,651,214 | 3/1987 | Rodriguez-Cavazos | 358/190 |
| 4,692,852 | 9/1987 | Hoover | 363/21 |

OTHER PUBLICATIONS

Two technical publications dated 1986 that were published by RCA Corporation, Consumer Electronics, Indianapolis, Indiana, that are related to RCA Television Chassis CTC 120.
A data sheet for Linear Integrated Circuits CA3210E and CA3223E of the RCA Corporation published May 1982, entitled, TV Horizontal/Vertical Countdown Digital Sync System.

Primary Examiner—Howard W. Britton
Assistant Examiner—E. Anne Faris
Attorney, Agent, or Firm—Eugene M. Whitacre; Joseph J. Laks; Sammy S. Henig

[57] ABSTRACT

A control circuit of a television receiver power supply is constructed using a plurality of transistors operating in a common base configuration. The base electrodes of each of the transistors is coupled to a common conductor rail line that maintains the collector currents in the transistors temperature compensated over a wide range of operating temperatures during normal operation power-up mode of the receiver. In a standby mode of the receiver, power dissipation in the transistors is reduced by applying an on/off control signal to the common conductor rail line that prevents the flow of the collector currents in each of the transistors. Consequently, the supply current requirement of the control circuit is reduced during the standby mode.

30 Claims, 3 Drawing Sheets

ON/OFF CONTROL CIRCUITRY FOR TELEVISION

The invention relates to an arrangement for reducing the power consumption in a television circuit during a period when such circuit is not required to perform at least some of its functions.

A television receiver, for example, may include a pulse-width modulator or voltage regulator that generates a pulse-width modulated control signal at a horizontal related frequency. The control signal controls a run power supply that supplies run supply voltage such as a regulated B+ supply voltage. The B+ supply voltage energizes a horizontal output stage during a power-up mode. The voltage regulator circuitry may be combined with a horizontal deflection circuitry and incorporated in an integrated circuit (IC) that is referred to herein as the deflection IC. The horizontal drive circuitry generates a horizontal drive signal that is coupled to a horizontal output stage. The deflection IC may be required to operate selectively in a power-up mode and in a standby mode in accordance with an on/off control signal provided by a remote receiver in the power-up mode. Such pulse-width voltage regulator may be required to supply the pulse-width modulated control signal for controlling the run power supply that generates the regulated B+ supply voltage used for operating deflection circuitry of a horizontal output stage of the receiver. When operation in a standby mode is required, such control signal may be required to prevent the power supply from energizing the deflection circuitry until such time as a user initiates a power-up command via the remote receiver that causes a start-up interval to begin.

A first portion of the deflection IC that includes, for example, the main voltage regulator and the horizontal deflection circuitry may be required to be energized during the power-up mode and during a start-up interval but may not need to be energized during the standby mode. On the other hand, the deflection IC may include a second portion, such as a shunt regulator internal to the IC, for example, that is required to be energized during both the power-up and the standby modes.

In one prior art circuit, a shunt switch is coupled between ground and a supply voltage receiving terminal of the deflection IC that receives an energizing voltage that supplies the entire power requirements of the deflection IC. During operation in the standby mode, the shunt switch that is controlled by the on/off control signal develops a low impedance between the terminal and a common conductor such as ground that reduces the energizing voltage to, approximately zero volts that disables the deflection IC. Disadvantageously, such shunt switch, when conductive, causes a substantial power dissipation.

The remote receiver, for example, may be energized during both the power-up mode and the standby mode by a separate standby power supply. The standby power supply may include a standby transformer having a primary winding that is coupled to an alternating current (AC) mains supply source. A voltage that is developed at a secondary winding of the transformer may be rectified to produce a DC, standby energizing voltage.

The standby energizing voltage and a run supply voltage of the run power supply may be selectively applied to a supply voltage receiving terminal of the deflection IC to form an energizing voltage at such terminal that energizes the deflection IC. The standby energizing voltage energizes those portions of the deflection IC that are required to be energized during the standby mode and during the start-up interval; whereas during the power-up mode, the run-mode power supply provides the entire or principal energizing voltage to the terminal of the deflection IC.

It may be desirable to reduce the supply current that is required from the standby transformer so as to reduce the cost of such transformer. To this end, it may be desirable to reduce the current consumption of the deflection IC during the standby mode.

In accordance with an aspect of the invention, during the standby mode, the on/off control signal provided by the remote receiver is coupled to the deflection IC to cause a reduction of energizing current consumption that is supplied by the standby power supply. Without the operation of the on/off control signal, current that is supplied by the standby power supply would have flown in the first portion of the deflection IC that need not be energized during the standby mode.

In carrying out a feature of the invention, the deflection IC receives its energizing voltage at the same terminal during both the power-up mode and the standby modes. Such arrangement, advantageously, simplifies the construction and design of the deflection IC, for example, by reducing the number of external connections, and also, interconnection between the deflection IC and other television circuitry within the television receiver.

In carrying out another aspect of the invention, reducing the energizing or supply current of the deflection IC is accomplished by applying the on/off control signal during the standby mode to corresponding control electrodes of predetermined selected stages of the deflection IC. Such selected stages are required to be active only during the normal operation power-up mode. In this way, the energizing current in the deflection IC during the standby mode is reduced. The energizing current consumption is reduced, advantageously, by reducing during the standby mode the quiescent current in each corresponding stage in accordance with the on/off control signal.

In accordance with a further aspect of the invention, the quiescent current in a given stage of the deflection IC is temperature compensated in accordance with a temperature compensated control signal, during the power-up mode. However, during the standby mode, the temperature compensated control signal is at a second level that switches off the quiescent current in the given stage.

A deflection circuit of a television apparatus embodying the invention produces a deflection current in a deflection winding during operation in a power-up mode. A source of a first supply voltage is developed during operation of the television apparatus in each of the power-up and in a standby mode. A control circuit is coupled to the deflection circuit for controlling the operation of the deflection circuit during operation in the power-up mode and for preventing the production of the deflection current during operation in the standby mode. The control circuit includes at least a first circuit stage that is coupled, during operation in each of the power-up and standby modes, to the source of the first supply voltage to form a current path. A first portion of a supply current flows in the current path from the source of the first supply voltage during operation in the power-up mode. A source of an on/off control signal that is selectively indicative of operation of said television apparatus in the power-up mode and in the standby mode is used for generating a second control signal during television apparatus operation in the power-up mode. The second control signal is applied to the first circuit stage to control the first portion of the supply current. During operation of the television apparatus in the standby mode, the second control signal causes the first portion of the supply current that flows in the first circuit stage to be reduced.

Figure 1B:
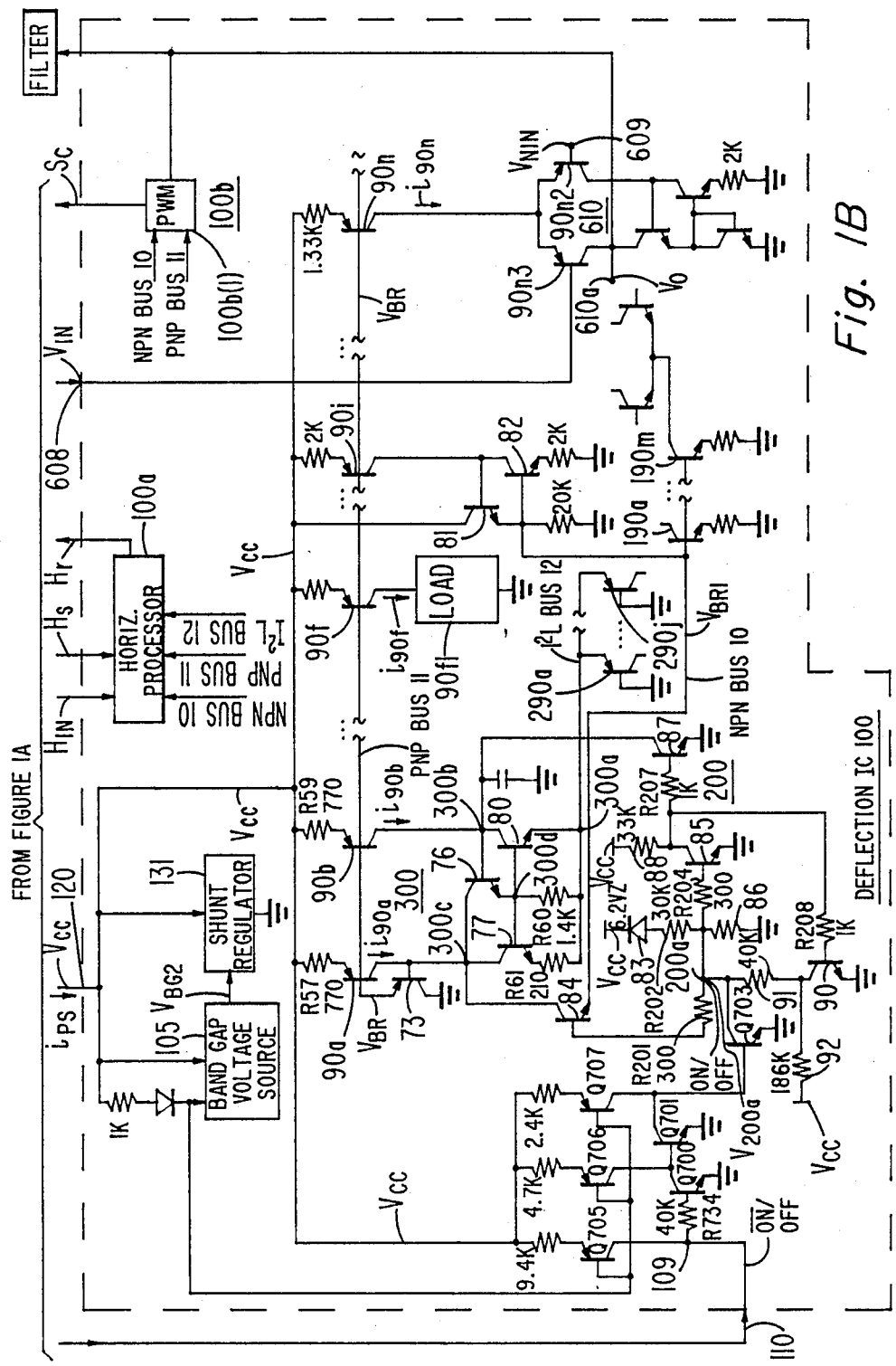

FIG. 1 that includes portions 1A and 1B illustrates a television power supply including a deflection IC, embodying the invention; and FIGS. 2a-2b illustrate waveforms useful for explaining the operation of the deflection IC of FIG. 1 during the start-up interval.

FIG. 1 illustrates a portion of a television receiver incorporating a deflection IC 100, embodying the invention. Such portion of the television receiver includes a bridge rectifier 101 that rectifies a mains supply voltage $V_{AC}$ to produce a DC, unregulated voltage $V_{UR}$. A conventionally designed power supply output stage or switch regulator 102, that may include a silicon controlled rectifier (SCR) produces during a normal operation power-up mode a regulated voltage B+ that is coupled to a flyback transformer T1. An input supply terminal 102c of regulator 102 is coupled to unregulated voltage $V_{UR}$. Regulated voltage B+ is developed at an output terminal 102d of switch regulator 102. Transformer T1 is coupled to a collector electrode of a deflection switching transistor Q1 of a horizontal circuit output stage 99 operating at a horizontal rate $f_H$. A control signal $H_r$, at the horizontal rate $f_H$, that is produced in a corresponding portion of deflection IC 100, referred to herein as a horizontal processor 100a, is coupled via a horizontal driver 666 to the base electrode of transistor Q1. The frequency of signal $H_r$ is determined by a horizontal oscillator, not shown in the FIGURES, that may be included in IC 100. Signal $H_r$ controls the switching of transistor Q1 to generate a deflection current $i_y$ in a deflection winding $L_Y$ of output stage 99. A retrace voltage $V_{w2}$ is produced in a conventional manner across a winding W2 of transformer T1 in each retrace interval of each horizontal period H. A second retrace voltage $H_{in}$ in a winding W3 of transformer T1 that is coupled to horizontal processor 100a is used for synchronizing deflection current $i_y$ to a synchronizing signal $H_s$. Signal $H_s$ is generated in a sync separator, not shown in the FIGURES.

A run supply voltage V+ is produced by rectifying voltage $V_{w2}$ in a rectifier arrangement 104 that is coupled to winding W2. DC Voltage V+ is coupled to a corresponding portion of deflection IC 100 that is referred to herein as switch mode regulator processor 100b to provide a feedback signal $V_{IN}$. Processor 100b generates a pulse width modulated signal $S_c$ that controls the duration, in each horizontal interval H, in which switch regulator 102 is conductive. The duty cycle of signal $S_c$ varies, in accordance with a difference between the feedback signal that is proportional to voltage V+ and a reference voltage $V_{NIN}$ that may be produced in a conventional manner. Signal $S_c$ causes regulated voltage B+ to be at a predetermined DC voltage level such as, illustratively, +125 volts. Signal $S_c$, voltage B+ and voltage V+ are produced, illustratively, when deflection IC 100 operates in the power-up mode but are not produced during television receiver standby mode operation.

Voltage V+ is coupled to a voltage divider 605 that includes series coupled resistors 601, 604 and 602. Resistor 604 includes a wiper k for developing at wiper k a voltage that is representative of, for example, voltage B+. The voltage at wiper k, that is adjustable by varying the position of wiper k, is coupled to an inverting input terminal 608 of an error amplifier 610 via a resistor 607.

An integrating, lowpass filter, not shown in FIG. 1, is coupled between inverting input terminal 608 and an output terminal 610a of amplifier 610 to provide the loop filter of regulator processor 100b. A filtered, error voltage $V_0$, developed at terminal 610a, is coupled to a pulse width modulator 100b(1), that produces pulse width modulated signal $S_c$. Signal $S_c$ is coupled to a control terminal 102a of switch regulator 102 to turn on a pass switch 102b of switch regulator 102 for a duration, in each period H, that varies in accordance with the duty cycle of signal $S_c$. The duration, during each horizontal period H, in which switch 102b conducts, that is controlled by signal $S_c$ is determined by the level of error voltage $V_0$ of error amplifier 610. Thus, the level of each of regulated voltages B+ and V+ is determined by a reference voltage $V_{NIN}$ that is produced in a conventional manner, not shown in the FIGURES.

A standby transformer T0 steps down voltage $V_{AC}$. The stepped down voltage is rectified in a rectifier arrangement 106 to produce a standby voltage $V_{SB}$. Standby voltage $V_{SB}$ is coupled to an energizing voltage receiving terminal 120 of deflection IC 100 through a resistor R1 that charges a capacitor 66, during, for example, the standby mode operation, to produce in capacitor 66 an energizing voltage $V_{cc}$ at terminal 120 of deflection IC 100. Regulated voltage V+ is coupled to terminal 120 via a diode D2 to supply voltage $V_{cc}$ from voltage V+ when deflection IC 100 operates in the power-up mode but not when the standby mode operation occurs.

Standby voltage $V_{SB}$ is coupled to a remote receiver 107 to provide the operating voltage of remote receiver 107. Remote receiver 107 is coupled via an MOS transistor 108 to IC 100. When transistor 108 is conductive, a low impedance is formed between a junction terminal 109 of a resistor R734 and between ground. The low impedance occurs after, for example, a user initiates a power-on command via an infra-red communication link that causes a start-up interval to occur, as described later on.

In the power-up mode that follows the start-up interval, the television receiver is fully operative. Conversely, after a power-off command is initiated by the user, transistor 108 becomes nonconductive and forms a high impedance circuit at terminal 109 that causes a standby mode to occur. In the standby mode the raster scanning on a display device of the television receiver is turned-off.

A transistor Q705, operating as a constant current source, has its collector coupled to junction terminal 109 between transistor 108 and resistor R734. As a result of the operation of transistors Q705 and 108, an on/off signal 110 is developed. Signal 110 is at a high level, or a second state, when transistor 108 is nonconductive, that corresponds to operation in the standby off-mode, and at a low level, or a first state, when it is conductive, that corresponds with operation in the power-up on-mode.

An input supply current $i_{PS}$ is coupled through terminal 120 to deflection IC 100 for providing the energizing current of deflection IC 100. During operation in the power-up mode, current $i_{PS}$ is supplied mainly by rectifier arrangement 104 through diodes D2 and D4; whereas, during operation in the standby mode, current $i_{PS}$ is supplied from standby transformer 106 via rectifier arrangement 106 and resistor R1.

Voltage $V_{cc}$ is regulated in deflection IC 100 by a shunt regulator 131 that may be required to regulate voltage $V_{cc}$ during operation in both the standby mode and the power-up mode. Regulation of voltage $V_{cc}$ during the standby mode may be desirable for protecting deflection IC 100 from an overvoltage condition at terminal 120 that may occur should voltage $V_{cc}$ exceed the voltage rating of deflection IC 100. If permitted to occur, such overvoltage condition may damage deflection IC 100. Also regulation of voltage $V_{cc}$ during the standby mode may be desirable for operating circuitry in deflection IC 100 that may be required to operate during the standby mode such as, for example, transistor Q705. Shunt regulator 131 regulates voltage $V_{cc}$ in accordance with a reference voltage $V_{BG2}$ that is generated during both the power-up and standby modes. Voltage $V_{BG2}$ is generated in, for example, a bandgap type voltage source 105 that is, therefore, required to operate during both the standby and the power-up modes.

Deflection IC 100 includes various circuit portions that, unlike shunt regulator 131 and bandgap voltage source 105, need not be energized during operation in the standby mode. For example, each of horizontal processor 100a and regulator processor 100b need not be energized during operation in the standby mode.

Reducing the level of current $i_{PS}$ that is supplied from standby transformer T0, during the standby mode and the start-up interval, is desirable in order to relax transformer T0 specifications so as to reduce the cost of transformer T0. Such cost is related to the current requirement imposed on transformer T0 that is directly proportioned to current $i_{PS}$. By coupling standby voltage $V_{SB}$ to capacitor 66 via resistor R1 that is relatively large, the current supplied by transformer T0 is maintained low even during standby and start-up.

A circuit portion of deflection IC 100 that does not have to be energized during the standby mode, may include a first plurality of transistors. Such arrangement is depicted by transistors 90a–90n of the P-N-P type. Each such transistor may be arranged in a common base configuration to form at the collector of such transistor a current source having a high output impedance. Each of transistors 90a–90n has its base electrode coupled to a common conductor, or rail line, that is referred to as PNP bus 11. It should be understood that some of transistors 90a–90n may be included in, for example, horizontal driver 100a and some others in regulator processor 100b.

Figure 2:
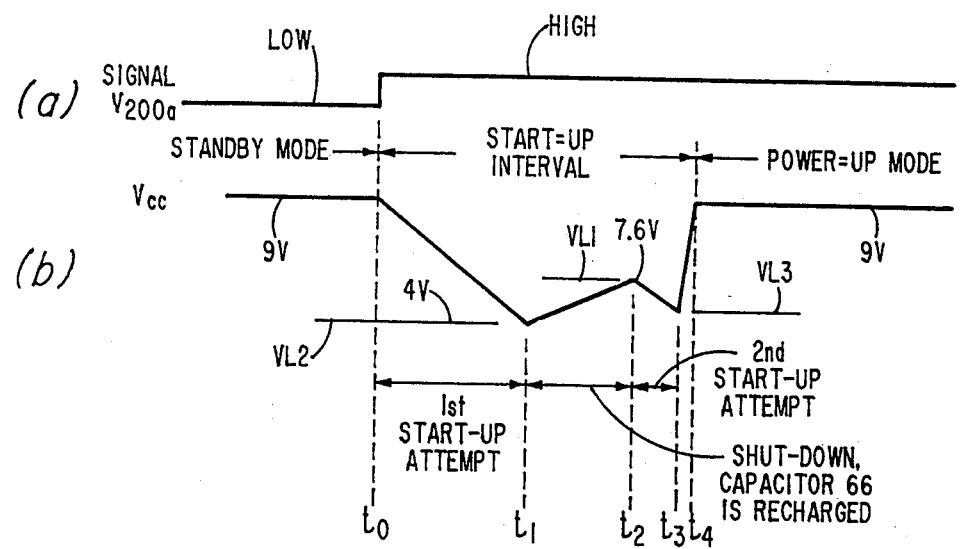

Transistor 90f, for example, illustrates one typical example of a circuit stage that is formed by a corresponding one of transistors 90a–90n. In such stage, a collector current $i_{90f}$ is coupled to a circuitry that is, symbolically, referred to as load circuit 90f1. A second typical example is shown in the arrangement of amplifier 610 that is included in regulator processor 100b of FIG. 2. Amplifier 610 of FIG. 1 forms a differential amplifier in which transistor 90n provides a current $i_{90n}$ that is coupled to the emitters of transistors 90n2 and 90n3 of differential amplifier 610. Output voltage $V_0$ of FIGS. 1 and 2 is developed at the collector of transistor 90n3 of FIG. 1.

The collector current in each of transistors 90a–90n is controlled by a voltage $V_{BR}$ that is coupled, via PNP bus 11, to the corresponding base electrode of each of transistors 90a–90n and that is generated by a temperature compensated current control arrangement 300. The emitter electrodes of the above-mentioned transistors 90a–90n are coupled through corresponding resistors to supply voltage $V_{cc}$ that is, as described before, a fixed DC voltage. Because of such arrangement, the collector currents in each of transistors 90a–90n track each other over a wide range of temperature to form a current mirror arrangement. Current control arrangement 300 controls voltage $V_{BR}$ in such a way that the collector current in each of transistors 90a–90n stays substantially constant when the temperature changes.

Current control arrangement 300 includes transistors 90a, 90b, 73, 76, 77 and 80. The collector of transistor 73 is grounded. The collector of transistor 90a is coupled to the base of transistor 73 and, at a terminal 300c, to the collectors of transistors 76 and 77. The emitter of transistor 77 is coupled to a terminal 300a via a resistor R61. The emitter of transistor 76 is coupled to the base of transistor 77, to the base of transistor 80 and, via a resistor R60, to terminal 300a. Transistor 80 is arranged in a common emitter configuration. The base of transistor 76 is coupled, at a terminal 300b, to the collectors of both transistor 80 and 90b. The emitter of transistor 80 is coupled to terminal 300a. Transistors 76, 77 and 80 form a temperature compensating feedback network that controls via transistor 73 voltage $V_{BR}$ and maintains constant currents $i_{90a}$ and $i_{90b}$ in respective transistor 90a and 90b.

Transistor 76 forms, with transistor 80, a feedback arrangement that causes a collector current $i_{90b}$ of transistor 90b to flow also as a collector current in transistor 80, by developing the corresponding base-emitter voltage in transistor 80 and across resistor R60. As described later on, current $i_{90b}$ is maintained constant over a wide range of temperatures.

When the temperature is constant, this feedback action tends to maintain a substantially constant current flow through resistor R60 and thus a corresponding constant current through the collector-emitter junctions of each of transistors 76 and 80. As the temperature varies, the base-emitter forward voltage of transistor 80 also varies.

In order to compensate for the variation of the base-emitter forward voltage of transistor 80 so as to insure corresponding constant currents through each of terminals 300c and 300a, transistor 77 is coupled with its base to sensing resistor R60. The current in resistor R60 is proportional to the voltage across the base-emitter junction of transistor 80 that varies inversely with temperature. Whereas, for a given voltage across resistor R60, the voltage across resistor R61 that determines the collector current in transistor 77 varies proportionally with the temperature. Thus, variations of the base-emitter forward voltages of transistors 77 and 80 have opposite effects on the sum of the currents in resistors R60 and R61 that causes, via a feedback arrangement, a collector current $i_{90a}$ in transistor 90a to be substantially constant when the temperature varies.

An example of an arrangement that provides temperature compensation similar to current control arrangement 300 is described in detail in U.S. Pat. No. 3,886,435, in the name of S. A. Steckler, entitled VBE VOLTAGE SOURCE TEMPERATURE COMPENSATION NETWORK that is incorporated by reference herein.

By maintaining a predetermined ratio between resistors R60 and R61, collector current $i_{90a}$ flowing through terminal 300c, that is approximately equal to the sum of the currents in the collectors of transistors 76 and 77 or in resistors R60 and R61, is maintained constant throughout a wide range of operating temperatures. Because of the feedback arrangement of transistor 73, voltage $V_{BR}$ causes the corresponding collector current in each of the other ones of transistors 90a–90n to be also temperature independent.

Terminal 300a is coupled to an I²L injector line 12 that provides a temperature compensated injection current that is equal to the sum of currents $i_{90a}$ and $i_{90b}$ to a portion of deflection IC 100 that utilizes the well known I²L technology. Transistor 290a–290j that are coupled to line 12 depict the injector transistors of such portion of deflection IC 100.

Another example of an arrangement that is similar to that of transistors 90a–90n is depicted by transistors 190a–190m of the N-P-N type that may be utilized in various stages of deflection IC 100. Each of transistors 190a–190m has its base electrode coupled to a common conductor, or rail line, that is referred to as NPN bus 10 and has its emitter electrode coupled via a corresponding resistor to ground.

Voltage $V_{cc}$ at terminal 120 is coupled to the collector of a transistor 81 which has its base coupled to the collector of transistor 90i. The emitter of transistor 81 is coupled to the base of a transistor 82 which is coupled back via its collector to the collector of transistor 90i. Transistors 81 and 82 produce a temperature compensated voltage $V_{BR1}$ on bus 10 that performs an analogous function as voltage $V_{BR}$ of bus 11 and that is controlled by voltage $V_{BR}$. Thus, voltage $V_{BR1}$ enables the collector currents in transistors 190a–190m to flow only when voltage $V_{BR0}$ enables the flow of the collector currents in transistors 90a–90n. Transistors 81 and 82 that are coupled to transistor 90i cause the collector current in each of transistors 190a–190m to be the current mirror of the collector current in transistor 90i that is controlled by voltage $V_{BR}$, and therefore, temperature independent.

Each of horizontal processor 100a and regulator processor 100b of FIG. 1 that produce signals $H_r$ and $S_c$, respectively, may include transistors from each of the groups 90a–90n, 190a–190m and 290a–290j. Thus, voltage $V_{BR}$ controls the operation of processor 100a and of regulator processor 100b. An example of a manner by which, during normal operation, transistors such as transistors 90a–90n and 190a–190m of FIG. 1 may be used for generating control signals such as, for example, signals $S_c$ and $H_r$ is depicted in a data sheet for a linear integrated circuit CA3210E and CA3223E of the RCA Corporation, published May, 1982, and entitled TV Horizontal/Vertical Countdown Digital Sync System.

When the collector currents in each of transistors 90a–90n of FIG. 1 is zero, signal $S_c$, for example, is in an inactive state. The result is that, during the standby mode, a pass switch 102b of regulator 102 remains nonconductive; consequently, voltage B+ is not generated and output stage 99 remains unenergized.

In carrying out an aspect of the invention, on/off signal 110 is coupled via an arrangement, operating as a signal inverter, that includes transistors Q700, Q701 and Q703, to a junction terminal 200a of an on/off switching arrangement 200. During operation in the power-up mode, a second on/off control signal $V_{200a}$ that is developed at junction terminal 200a is at a high level as a result of signal 110 being at the low level; conversely, during operation in the standby mode signal $V_{200a}$ is at a low level.

On/off switching arrangement 200 includes a zener diode 83 that has its cathode coupled to voltage $V_{cc}$ and its anode coupled via a resistor R202 to junction terminal 200a that is coupled to the bases of two switching transistors 84 and 85. Junction terminal 200a is coupled via a resistor 86 to ground.

The emitter of switching transistor 84, that is conductive only during a short interval following a user initiated power-up command, referred to herein as the start-up interval, is coupled to bus 10 at a junction between the base of transistor 82 and the emitter of transistor 81. The collector of transistor 84 is coupled back to both collectors of transistors 76 and 77 of current control arrangement 300 at terminal 300c.

The collector of transistor 85, operating as a switch, is coupled to the bases of transistors 87 and 90 and to voltage $V_{cc}$ via a resistor 88 to turn-on transistors 87 and 90 when transistor 85 is nonconductive. The collector of transistor 87 is coupled back at terminal 300b to the base of transistor 76, to the collector of transistor 80 and to the collector of transistor 90b.

During the standby mode, control signal $V_{200a}$, that is at the low level as a result of signal 110 being at the high level, causes transistor 87 to be in saturation. Consequently, a collector current $i_{90b}$ of transistor 90b that flows into terminal 300b is shunted away from transistor 80 by transistor 87 that is conductive. Therefore, the collector current in each of transistors 76, 77 and 80 is forced to be zero. It follows that when on/off control signal 110 is at the high level, as a result of the user initiated power-off command, no base current flows in transistor 73 of arrangement 300. The emitter current in transistor 73 is, therefore, also zero.

Voltage $V_{BR}$ is, during normal operation power-up mode, a temperature compensated voltage that causes the corresponding collector currents in transistors 90a–90n to be temperature compensated, as described before.

Thus, in accordance with an aspect of the invention, in the standby mode, voltage $V_{BR}$ causes the base current and, hence, the emitter current, in each of transistors 90a–90n, to be zero. Thus, temperature compensated arrangement 300 that generates temperature compensated voltage $V_{BR}$ couples on/off signal 110 to bus 11 to turn off transistors 90a–90n. Because the collector current in transistor 90i is zero, the emitter current in each of transistors 190a–190m is also zero. Also, because the emitter current in each of transistors 76, 77 and 80 is zero, I²L injector transistors 290a–290j become also nonconductive. The result is that control signal $S_c$ remains at an inactive state that prevents conduction of switch 102b so as to prevent the generation of voltage B+. It follows that during the standby mode, supply current $i_{PS}$ that flows in deflection IC 100 and that is proportional to the sum of the emitter currents in transistors 90a–90n, for example, is reduced relative to its value during the power-up mode. The result is that current loading from standby transformer TO is, advantageously, reduced during the standby mode.

As described before, when the user initiates the power-up mode, transistor 108, that is coupled to remote receiver 107, become conductive that causes signal 110 to be at the low level. When transistor Q703 becomes nonconductive, due to signal 110 being at the low level, conductive zener diode 83 generates signal $V_{200a}$. Zener diode 83 is conductive as long as voltage $V_{cc}$ exceeds a predetermined minimum, or threshold, first level. Zener diode 83 prevents initiation of the start-up operation if capacitor 66 is not fully charged above the first level. On/off control signal $V_{200a}$ at terminal 200a that is pulled up to a sufficiently high level by conductive zener 83 causes transistors 85 and 84 to become turned-on. With transistor 85 conducting, transistors 87 and 90 are turned off.

During the start-up interval and immediately after signal $V_{200a}$ causes transistors 84 and 85 to turn on, transistor 84 sinks current from the base of transistor 73, which begins to conduct simultaneously with transistor 84. Transistor 85 shunts the base currents of transistors 87 and 90, causing them to turn off. The conduction of transistor 73 causes transistors 90a, 90b and 90i to conduct the corresponding collector currents. Transistor 87 being turned off, allows the conduction of transistor 90b to turn on the feedback network comprising transistors 76, 77 and 80. Conduction of transistor 90i turns on transistors 81 and 82 that cause voltage $V_{BR1}$ at the emitter of transistor 84 to increase. The increase in voltage $V_{BR1}$ causes transistor 84 to become nonconductive. Transistor 73 base current is now supplied by conduction of transistors 76 and 77. In this way, control current arrangement 300 enables the emitter currents in each of transistors 90a–90n and 190a–190m to flow; thereby, deflection IC 100 that may include a horizontal oscillator, not shown in the FIGURES, becomes fully operational. The result is that signals $H_r$ and $S_c$ are generated and deflection switching transistor Q1 is switched on and off at the deflection rate $f_H$ that initiates the generation of voltage V+. As described before, voltage $V_{cc}$ of deflection IC 100 is obtained during the power-up mode from voltage V+.

FIGS. 2a and 2b illustrate schematically waveforms useful for explaining the operation of deflection IC 100 of FIG. 1 during the start-up interval. Similar numbers and symbols in FIGS. 1, 2a and 2b depict similar items or functions.

During portion $t_0$–$t_1$ of the start-up interval of FIGS. 2a and 2b, that immediately follows the user initiated power-up command, IC 100 of FIG. 1 is powered primarily from the charge already stored in capacitor 66. Because of the loading caused by, for example, transistor 90a–90n, capacitor 66 may discharge prior to voltage V+ attaining its normal operational level. The result is that voltage $V_{cc}$ of FIG. 2b may be reduced at, for example, time $t_1$ to a level so low that voltage $V_{cc}$ is insufficient to sustain operation in the power-up mode. The discharge of capacitor 66 of FIG. 1 may occur since deflection IC 100 may draw more current than can be provided by standby voltage $V_{SB}$ via resistor R1 that is relatively large. Resistor R1 is designed to be a large resistor so as to reduce loading of transformer T0 during the standby mode and start-up interval.

Should capacitor 66 be discharged, during the start-up interval, by, for example, current $i_{PS}$, zener diode 83 will turn off when capacitor 66 voltage falls below the breakdown zener voltage of diode 83. Transistor 85 remains, however, conductive, due to a supply of current through resistors 91 and 92. Deflection IC 100 will continue to operate to generate signals $H_r$ and $S_c$ until, for example, time $t_1$ of FIG. 2b when voltage $V_{cc}$ in capacitor 66 of FIG. 1 falls below a second predetermined level VL2 of FIG. 2b. The second predetermined level VL2 is a lower holding level of, for example, 4 volts, which is sufficient to supply enough current through resistors 91 and 92 of FIG. 1 to maintain conduction of transistor 85. Below the lower holding level that occurs at time $t_1$ of FIG. 2b, transistor 85 of FIG. 1 turns off. When transistor 85 turns off, however, transistors 87 and 90 will again saturate, thus turning off transistor 76 which will cause the emitter currents in transistors 90a–90n and 190a–190m to become zero that aborts the start-up operation after time $t_1$ of FIG. 2b. With transistors 87 and 90 of FIG. 1 again saturated, supply current $i_{PS}$ from capacitor 66 will be reduced and the previously described start-up process will be repeated.

Capacitor 66 may, therefore, be recharged as many times as are necessary until power-up operation is obtained that causes voltage V+ to be operative so as to supply voltage $V_{cc}$. Thus, during such portions of the start-up interval, such as, for example, during interval $t_1$–$t_2$ of FIG. 2b, deflection IC 100 of FIG. 1 is essentially in an off or an aborted condition with the load current sources disabled until capacitor 66 recharges to the first predetermined voltage such as level VL1 that occurs at time $t_2$ of FIG. 2b.

During interval $t_2$–$t_3$, a second start-up attempt occurs that is similar to that occurring during interval $t_0$–$t_1$. In the example shown, at time $t_3$ voltage V+ of FIG. 1 becomes sufficiently large so as to begin charging capacitor 66 via diode D2. During interval $t_3$–$t_4$ of FIG. 2b, capacitor 66 of FIG. 1 is charged up to a level that is controlled by shunt regulator 131 that occurs at time $t_4$ of FIG. 2b. Henceforth, start-up operation ceases and normal operation power-up mode begins. It should be understood that a successful start-up attempt that is not aborted may occur immediately after time $t_0$ of FIG. 2b when, for example, the amplitude of voltage $V_{AC}$ is sufficiently high.

During the power-up mode that immediately follows the start-up interval, signal 110 is maintained at the low level, thereby maintaining signal $V_{200a}$ at a high level. Transistors 87 and 84 are maintained nonconductive, and transistors 73, 76, 77 and 80 conductive. Consequently, normal operation emitter currents in transistors 90a–90n and 190a–190m, that are controlled by voltage $V_{BR}$, and normal operation level of supply current $i_{PS}$ are maintained.

Thus, in accordance with a feature of the invention, voltage $V_{BR}$ on PNP bus 11 that is temperature compensated during the power-up mode, operates as a switching signal, during the standby mode. In this way the emitter currents in transistors 90a–90n are, advantageously, switched off, during the standby mode.

What is claimed:
1. A television apparatus, comprising:
   a deflection circuit for producing a deflection current in a deflection winding during operation of said television apparatus in a power-up mode;
   a source of a first supply voltage that is developed during operation of said television apparatus in each of said power-up and a standby mode;
   a control circuit coupled to said deflection circuit for controlling the operation of said deflection circuit during operation in said power-up mode and for preventing the production of said deflection current during operation in said standby mode, said control circuit including at least a first circuit stage that is coupled during operation in each of said power-up and standby modes to said source of said first supply voltage to form a current path in which a first portion of a supply current flows from said source of said first supply voltage during operation in said power-up mode;

a source of an on/off control signal that is selectively indicative of operation of said television apparatus in said power-up mode and in said standby mode; and means coupled to said source of said on/off control signal for generating a temperature compensated second control signal during television apparatus operation in said power-up mode that is applied to said first circuit stage to control said first portion of said supply current in a way that is temperature compensated, said temperature compensated generating means being responsive to said on/off control signal such that during operation of said television apparatus in said standby mode, said on/off control signal causes said temperature compensated second control signal to reduce said first portion of said supply current that flows in said first circuit stage.

2. An apparatus according to claim 1 further comprising a first plurality of circuit stages that form corresponding current paths to corresponding different portions of said supply current such that said second control signal that is coupled to each of said first plurality of circuit stages separately causes a corresponding reduction of each of said corresponding different current portions in each of said circuit stages.

3. An apparatus according to claim 1 wherein said deflection circuit of said television circuit includes a flyback transformer for producing a second supply voltage from said flyback transformer and wherein said source of said first supply voltage develops first supply voltage from said second supply voltage during said power-up mode.

4. An apparatus according to claim 1 wherein said control circuit is coupled to said deflection circuit for producing a deflection rate related signal for controlling the timings of said deflection current in said deflection winding of said deflection circuit.

5. An apparatus according to claim 4 further comprising controllable means for generating a second supply voltage wherein said control circuit further produces a pulse-width modulated control signal that is coupled to said second supply voltage generating means for controlling said second supply voltage during said power-up mode and for removing said second supply voltage during said standby mode.

6. An apparatus according to claim 5 wherein said second supply voltage is coupled to said deflection circuit of said television apparatus to provide a substantial portion of an entire energy requirement of said deflection circuit.

7. An apparatus according to claim 1 wherein said first circuit stage comprises a first transistor having a first main current conducting electrode that is coupled to said source of first supply voltage and that is energized thereby during said power-up and standby modes such that said first portion of said supply current flows from said source of first supply voltage in said first main current conducting electrode during said power-up mode and wherein said second control signal is coupled to a control electrode of said first transistor.

8. An apparatus according to claim 7 wherein said second control signal causes said first transistor to operate as a switch that is nonconductive when said on/off control signal is indicative of operation in said standby mode.

9. An apparatus according to claim 7 wherein said control circuit further comprises a first plurality of transistors having control electrodes that are coupled to said on/off control signal via a common conductor that causes a corresponding current in each of said first plurality of transistors to be the current mirror of said current in said first transistor that is temperature compensated.

10. An apparatus according to claim 9, wherein each transistor of said first plurality of transistors operates as a current source to produce a corresponding portion current in a corresponding main current conducting electrode thereof only during said power-up mode.

11. An apparatus according to claim 1 wherein said source of said second control signal comprises a circuit arrangement that requires an $I^2L$ injection current for operation during said power-up mode, and wherein said means for generating said second control signal is coupled to said circuit arrangement for supplying said $I^2L$ injection current that is temperature compensated such that said means for generating said second control signal prevents said $I^2L$ injection current from flowing during said standby mode.

12. An apparatus according to claim 1 wherein said means for generating said second control signal comprises a source of temperature dependent voltage that is proportional to a voltage established across a first conductive P-N junction structure, a first resistance coupled in parallel with said source of temperature dependent voltage for drawing a current at a level that is in accordance with said voltage across said first P-N junction structure, a second P-N junction structure and second resistance that form with said second P-N junction structure a series arrangement that is coupled in parallel with said first resistance for conducting a current in said second resistance that is in accordance with said voltage across said first P-N junction structure, said current in said second resistance having a temperature coefficient which is proportional to the negative of that of said current in said first resistance that substantially compensates for said temperature coefficient of said current in said first resistance over a wide range of operating temperature, and a feedback arrangement responsive to a sum of said currents in said first and second resistances for developing said second control signal to provide a temperature compensated control voltage that is coupled to a control electrode of a first transistor that is included in said first circuit stage.

13. An apparatus according to claim 12 wherein said feedback arrangement comprises a second transistor having a main current conducting electrode that is coupled to said control electrode of said first transistor and wherein said current in said first transistor, said current in said first resistance and said current in said second resistance are combined at a control electrode of said second transistor for developing a voltage thereat that is coupled to said control electrode of said first transistor via said main current conducting electrode of said second transistor.

14. An apparatus according to claim 1 wherein said control circuit further comprises a plurality of transistors, each transistor of said plurality of transistors having a control electrode that is coupled to a current conducting terminal of said first circuit stage such that a corresponding current in each transistor of said plurality of transistors is the current mirror of said current in said first circuit stage that causes a corresponding reduction in said corresponding current in each of said transistors of said plurality of transistors during said standby mode.

15. An apparatus according to claim 1 wherein said source of first supply voltage comprises a source of AC mains voltage, a voltage step-down transformer coupled to said source of AC mains voltage, a rectifier having an input terminal that is coupled to said step-down transformer for generating a standby supply voltage by rectifying a voltage that is developed at said step-down transformer that supplies said supply current during said standby mode.

16. An apparatus according to claim 15 further comprising, a source of a second voltage that is developed during said power-up mode and means for selectively coupling said standby supply voltage to an input supply terminal of said control circuit during said standby mode and for selectively coupling said second supply voltage during said power-up mode so as to produce said first supply voltage at said input supply terminal during both said power-up and standby modes.

17. An apparatus according to claim 16 wherein said source of second supply voltage comprises a winding of a flyback transformer coupled to said deflection circuit and a rectifier coupled to said winding for providing said second supply voltage only during said power-up mode.

18. An apparatus according to claim 15 wherein said second control signal causes a reduction in a current that flows in said step-down transformer during said standby mode.

19. An apparatus according to claim 1 wherein said source of said on/off control signal comprises a remote receiver of said television apparatus.

20. An apparatus according to claim 1 wherein said control circuit further includes a circuit portion that is coupled to said first supply voltage and that is energized thereby during both said power-up and standby modes.

21. An apparatus according to claim 20 wherein said circuit portion comprises a shunt regulator that regulates said first supply voltage.

22. An apparatus according to claim 1 wherein said control circuit forms an integrated circuit and wherein said first supply voltage is developed at that terminal during both said power-up and standby modes.

23. In television apparatus having a power supply including a capacitor for energizing a load circuit and a first current source for charging said capacitor prior to a start-up interval to a voltage at a level that exceeds a predetermined first voltage level, a start-up circuit, comprising:
a source of an on/off control signal that is selectively indicative when operation in a power-up mode and when in a standby mode is required;
means responsive to said voltage in said capacitor and to said on/off control signal for generating a second control signal that enables said power supply to energize said load circuit when said on/off control signal is at a first state that is indicative that operation in said power-up mode is required, provided said level of said voltage in said capacitor exceeds at least a predetermined second voltage level that is lower than said first voltage level, said second control signal disabling said power supply to prevent energizing of said load circuit when said on/off control signal is at a second state that is indicative that operation of said power supply in said standby mode is required, said power supply when enabled drawing a supply current from said capacitor that tends to discharge said capacitor and when disabled said power supply drawing a substantially smaller current from said capacitor;
means coupled to said capacitor and responsive to the attainment of said second voltage level in said capacitor, caused by discharging of said capacitor by said supply current that is drawn from said capacitor, for disabling said power supply so as to reduce said supply current drawn from said capacitor each time said capacitor discharges to said second voltage level so that such reduction in said current that is drawn from said capacitor permits said capacitor to recharge from said first current source; and
means responsive to the energization of said load circuit for generating a second current that is controlled by said load circuit and that develops a steady state voltage across said capacitor during said power-up mode, that prevents said capacitor from discharging.

24. The arrangement defined in claim 23, wherein said load circuit comprises means for developing a horizontal rate signal that is coupled to a horizontal deflection circuit and wherein said deflection circuit provides said second current source.

25. The arrangement defined in claim 23, wherein said power supply comprises a plurality of controllable current sources, each supplying current to a respective one of a plurality of loads within said load circuit, said plurality of current sources being coupled to said capacitor to draw said supply current from said capacitor, and wherein said start-up circuit is coupled to corresponding control terminals of said current sources for reducing said supply current during said standby mode.

26. A power supply for a television apparatus, comprising:
a source of an input supply voltage;
a source of an on/off control signal for selectively establishing operation of said power supply in a power-up mode and in a standby mode, respectively;
means coupled to said input supply voltage and responsive to a second control signal for generating from said input supply voltage a first supply voltage only during said power-up mode;
means coupled to said input supply voltage for generating a standby supply voltage during said standby mode of operation of said power supply
means selectively coupled to said first and to said standby supply voltages during said power up and standby modes, respectively, for generating a second supply voltage that is formed during both said power-up and standby modes; and
a control circuit for said power supply coupled to said second supply voltage generating means to draw therefrom a supply current during said power-up mode, said control circuit including a first plurality of circuit stages that generate said second control signal during said power-up mode and that are each coupled to said second supply voltage during both said power-up and standby modes such that a second plurality of said circuit stages that are required to be active only during said power-up mode form a corresponding plurality of current paths for conducting corresponding different portions of said supply current from said second supply voltage generating means during said power-up mode, said control circuit further including means responsive to said on/off control signal for generating a corresponding plurality of third control signals that are each coupled to corresponding terminals of said current stages, such that, when said on/off control signal is indicative that operation in said standby mode is required, each of said corresponding plurality of third control signals at said corresponding terminals changes to attain a level that causes a reduction in a corresponding portion of said portions of said supply current that flows in a corresponding current path of said current paths that reduces said supply current that is drawn by said control circuit from said standby supply voltage generating means during said standby mode.

27. An apparatus according to claim 26 wherein said on/off control signal is coupled to said corresponding terminals of said circuit stages via a conductor that cause each of said corresponding plurality of third control signals at said terminals to be substantially the same.

28. An apparatus according to claim 26 wherein said plurality of third control signals generating means is temperature compensated that causes each of said plurality of third control signals to be temperature compensated during said power-up mode.

29. An apparatus according to claim 26 wherein each of said circuit stages operates as a nonconductive switch during said standby mode and as a temperature compensated current source during said power-up mode.

30. An apparatus according to claim 26 wherein said second supply voltage generating means comprises a storage capacitor and a resistor that is coupled to said standby supply voltage and to said capacitor to charge said capacitor during a start-up interval when said second supply voltage that is developed in said capacitor is lower than a first predetermined level and wherein said plurality of third control signals generating means causes a reduction in said supply current when said second supply voltage in said capacitor is lower than said first predetermined level.

* * * * *